UNITED STATES PATENT OFFICE.

HENRY HICKS HURT, OF COVINGTON, VIRGINIA, ASSIGNOR TO JACOB S. ROBESON, OF AU SABLE FORKS, NEW YORK.

PROCESS OF TREATING WASTE SULFITE LIQUOR AND COMPOUND OBTAINED THEREFROM.

1,075,916.

Specification of Letters Patent.   Patented Oct. 14, 1913.

No Drawing.   Application filed February 29, 1908.   Serial No. 418,513.

*To all whom it may concern:*

Be it known that I, HENRY HICKS HURT, a citizen of the United States, and a resident of Covington, Alleghany county, Virginia, have invented an Improved Process of Treating Waste Sulfite Liquor and Compound Obtained Therefrom, of which the following is a specification.

My invention relates to compositions of matter and the method of making the same; and it comprises a composition containing a compound of a sesquioxid base with unchanged organic matters of waste sulfite liquor and the process of preparing the same.

My improved process comprises the treatment of waste sulfite liquor, which may be in a warm state, but should contain its natural components in a substantially unchanged state, with a soluble salt of a sesquioxid with an acid capable of forming insoluble salts with the base or bases contained in such sulfite liquor by the separation of such insoluble salt, and the subsequent purification of the so-formed soluble compound of the sesquioxid base and the organic matters of such liquor.

I have discovered that by treating waste sulfite liquor containing its natural organic matters in a substantially unchanged state with certain reagents to produce a combination of such organic matters existing therein with a sesquioxid base, I can produce new compounds of great utility in the arts, such compounds for instance being susceptible of use in tanning and mordanting, besides forming adhesives of a highly desirable nature.

In the manufacture of cellulose or paper pulp under what is known as the "sulfite process," which consists in boiling wood and other fibers under pressure in a solution containing sulfurous acid and a base, such as lime, a large quantity of a watery mixture known as "waste sulfite liquor" is produced, that hitherto has had little value besides being highly objectionable in a number of ways and very difficult of disposal. In the patent granted to Jacob S. Robeson, October 16, 1906, No. 833,634, a process of treating such waste liquor for the purpose of recovering the greater portion of the colloidal matter, as well as all of the contained resins, gums and other extracted constituents of the woody tissue, is fully described and claimed, and for carrying out the process forming the subject of my invention, I prefer to use a concentrated body of the material made in accordance with the patented process. This material contains the natural organic matters of the sulfite liquor in a substantially unchanged state. It will be understood, however, that my improved process can be carried into operation with the thin liquor as received from the digester, or at any degree of concentration short of dryness; the liquor being further concentrated, if desired, to any degree, after treatment according to my process.

Waste liquors from the digestion of spruce wood, (*Picea alba*), such for instance as those treated in accordance with the patented process, appear to have organic constituents particularly applicable to the present purpose, although similar liquors from the digestion of other woods may be employed. The waste liquor when concentrated in accordance with the patented process appears to have its organic matter in substantially the same condition as in the original liquor; retaining to the full the original physical and chemical characteristics of such matter. This I believe to be essential for the present purposes, since with such organic matter altered or changed in any way, compositions are produced which are of much less value.

On boiling wood with solution of acid sulfites, such as calcium acid sulfite, in the well-known "sulfite process" of making paper pulp, a large percentage of the wood goes into solution, forming new compounds with the sulfite, these compounds probably, at least to a large extent, being in the nature of salts of a sulfonic acid; the dissolved organic matter uniting with the acid radical to form new organic compounds of the nature of sulfonic acids and these new compounds forming sulfonates with the base present. In boiling down the sulfite liquor by the process described and claimed in the stated patent, these organic matters of the original sulfite liquor remain substantially unchanged; that is, the concentrated product contains the same sulfonates and other bodies that exist in the original sulfite liquor.

As the sulfite liquor usually contains lime as a base neutralizing the organic and sulfonated organic matters present, compositions under the present invention can be simply and easily made by mixing such sulfite liquor, preferably as stated in the concentrated form, with a solution of a sulfate of a sesquioxid. Other sesquioxid salts may be employed, but the sulfates are cheap and are highly convenient and satisfactory for this purpose. Such sulfates react with the lime present in the sulfite liquor to form insoluble sulfate of calcium, which separates out and leaves in solution the organic matter of the sulfite liquor combined with the sesquioxid base employed.

As the sesquioxid, I may employ ferric oxid, aluminum or chromium oxid; depending upon the particular purpose to which the resulting composition is to be applied. In using a sulfate of a sesquioxid, I may use either the simple sulfate, such as ferric sulfate, aluminum sulfate or chromium sulfate, or I may use the corresponding alums. For most purposes, however, the latter are less advantageous, as they leave the solution encumbered with salts.

In carrying my improved process into operation, I proceed substantially as follows: To about two hundred (200) pounds of the concentrated liquor made in accordance with the patented process, at a consistency of about 31° Bé., (or proportionate amounts, relative to the degree of concentration,) and at a suitable temperature, I add from twenty (20) to twenty-five (25) pounds of ordinary sulfate of alumina of commerce. The sulfate of alumina may be dissolved prior to its admixture with the waste sulfite liquor in from forty (40) to seventy-five (75) pounds of water preferably free from lime and magnesia, and, by preference, distilled water. Where iron or chromium compounds are desired, proportional amounts of ferric or chromic sulfate may be substituted for the aluminum sulfate. The temperature at which this reaction is performed is not a matter of indifference. When the solutions of the sesquioxid salt and the concentrated waste liquor are mixed in the cold, the precipitate takes a greater time to form. It is better, therefore, to perform this precipitation with the liquids warm, the more so as such action gives a precipitate of better physical character, indicative of a more complete removal of the lime salts and other combined elements. When the concentrated liquor is made as described in the patented process by evaporating such liquor in a multiple effect, the temperature at which the concentrated liquid leaves the last effect is a convenient one; this temperature generally being around 130° to 140° F. The precipitate made under these conditions is more or less flocculent, filters well, and is capable of ready separation by the use of a filter press or other convenient means.

After standing for some time the filtered solution is found, as a rule, to throw down a second precipitate, which appears to be mainly free sulfur. This sulfur is probably derived from the original waste sulfite liquor, in which it may be in solution, or pseudo-solution, or perhaps in the form of a salt of one of the thionic acids. Whatever the form in which the sulfur exists in the original liquor, in which form it is apparently tolerably permanent, yet when the organic matters combine with the sesquioxid base as described, it becomes insoluble and settles out. For some of the uses, as for instance, in tanning, for which my improved compositions are available this sulfur may be removed, and as stated, it settles out after the liquid stands for some time and may then be filtered off, or the liquid decanted away. After the second purification, the liquid may be brought to any desired density, as by evaporation and condensation or by dilution with water.

The contained compound of a sesquioxid base with the organic matters existing in waste sulfite liquor, appears to be quite stable in character, allowing such compound to be transported and stored without substantial change occurring, other than the stated separation of sulfur. Upon isolating this compound from the substantially pure solution formed as described, as by evaporating such solution to dryness, it is found to be perfectly soluble in water, exhibiting no tendency to set or become insoluble. For many purposes it may be desirable to reduce the compound produced according to the prescribed method to dryness, since solutions of the same may be readily produced by addition of water to such solid matter, the solutions so prepared having substantially the properties of the original solution.

The compositions or compounds produced in the described manner are susceptible of many uses. That formed by the addition of aluminum sulfate to the waste liquor is an excellent tanning agent and in a companion application filed February 29, 1908, Serial No. 418,514, I have described a process of tanning in which such material is employed; the chromium compound is also applicable for this purpose; the iron compound is not so well suited for tanning, but is susceptible of use as an adhesive in the briqueting of finely divided material and for other purposes of a similar nature. The aluminum compound is also capable of serving as an adhesive and sizing material; both of the constituents being soluble in alkali, it may be mixed with or dissolved in alkaline sizing material, such as rosin size, although the aluminum compound is believed to be a good sizing material *per se*. The iron compound, because of its cheapness, may well be used for many purposes. In tanning, the aluminum and chromium compounds are particularly advantageous.

I claim:

1. As a new composition of matter, a composition containing a compound of a sesquioxid base with the organic matters of sulfite waste liquor, said composition containing the organic matters of sulfite waste liquor in substantially their original relative ratios and of substantially their original composition.

2. As a new composition of matter, a compound of alumina with the organic matters of waste sulfite liquor, said composition containing the organic matters of sulfite waste liquor in substantially their original relative ratios and of substantially their original composition.

3. As a new composition of matter, a solution containing the organic matters of sulfite waste liquor, in substantially their original relative ratios and of substantially their original composition, said solution being substantially free of lime and containing a dissolved sesquioxid base in the amount equivalent to the lime of unchanged sulfite liquor.

4. As a new composition of matter, a solution containing the organic matters of sulfite waste liquor in substantially their original relative ratios and of substantially their original composition, said solution being substantially free of lime and containing alumina in the amount equivalent to the lime of unchanged sulfite liquor.

5. The process of making a tanning composition which comprises reacting upon a sulfite waste liquor preparation containing the original organic matters in their normal relative ratio and of their normal character with a salt of a sesquioxid with an acid able to form insoluble lime salts, and removing the insoluble lime salt produced.

6. The process of making a tanning composition which comprises reacting upon a sulfite waste liquor preparation containing the original organic matters in their normal relative ratio and of their normal character with a salt of alumina with an acid able to form insoluble lime salts, and removing the insoluble lime salt produced.

7. The process of making a tanning composition which comprises reacting upon a sulfite waste liquor preparation containing the original organic matters in their normal relative ratio and of their normal character with a sulfate of a sesquioxid, and removing the insoluble calcium sulfate formed.

8. The process of making a tanning composition which comprises reacting upon a sulfite waste liquor preparation containing the original organic matters in their normal relative ratio and of their normal character with a sulfate of alumina, and removing the insoluble calcium sulfate formed.

9. The process of making a tanning composition which comprises reacting upon a sulfite waste liquor preparation containing the original organic matters in their normal relative ratio and of their normal character with a sulfate of a sesquioxid, removing the insoluble calcium sulfate formed and removing the free sulfur subsequently precipitated.

10. The process of making a tanning composition which comprises reacting upon a sulfite waste liquor preparation containing the original organic matters in their normal relative ratio and of their normal character with a sulfate of alumina, removing the insoluble calcium sulfate formed and removing the free sulfur subsequently precipitated.

In testimony whereof, I have signed my name to this specification, in the presence of two subscribing witnesses.

HENRY HICKS HURT.

Witnesses:
 WILLIAM ABBE,
 L. H. GROTE.